United States Patent
Saravanan

(10) Patent No.: US 11,539,684 B2
(45) Date of Patent: Dec. 27, 2022

(54) DYNAMIC AUTHENTICATION SCHEME SELECTION IN COMPUTING SYSTEMS

(71) Applicant: Microsoft Technology Licensing, LLC, Redmond, WA (US)

(72) Inventor: Paranthaman Saravanan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 16/820,071

(22) Filed: Mar. 16, 2020

(65) Prior Publication Data

US 2021/0288954 A1    Sep. 16, 2021

(51) Int. Cl.
*H04L 9/40* (2022.01)
*G06F 9/445* (2018.01)
*H04L 9/32* (2006.01)
*H04L 67/02* (2022.01)
*H04L 69/22* (2022.01)

(52) U.S. Cl.
CPC ...... *H04L 63/0807* (2013.01); *G06F 9/44505* (2013.01); *H04L 9/3247* (2013.01); *H04L 63/123* (2013.01); *H04L 67/02* (2013.01); *H04L 69/22* (2013.01)

(58) Field of Classification Search
CPC ... H04L 63/0807; H04L 9/3247; H04L 63/12; H04L 69/22; H04L 69/24
See application file for complete search history.

(56) References Cited

U.S. PATENT DOCUMENTS

| | | | |
|---|---|---|---|
| 7,194,763 | B2 | 3/2007 | Potter et al. |
| 8,245,051 | B2 | 8/2012 | Johnson et al. |
| 8,347,356 | B2 | 1/2013 | James et al. |
| 9,374,356 | B2 | 6/2016 | Sondhi et al. |
| 2003/0046391 | A1 | 3/2003 | Moreh et al. |
| 2007/0143834 | A1 | 6/2007 | Leinonen et al. |

(Continued)

OTHER PUBLICATIONS

"International Search Report and Written Opinion Issued in PCT Application No. PCT/US21/014475", dated May 6, 2021, 11 Pages.

(Continued)

*Primary Examiner* — Esther B. Henderson
(74) *Attorney, Agent, or Firm* — Christopher J. Volkmann; Kelly, Holt & Christenson, PLLC

(57) ABSTRACT

Techniques of dynamic authentication scheme selection in distributed computing systems are disclosed herein. One example technique includes analyzing a received authentication request for an indicator of an authentication scheme that is supported by a computing service submitting the authentication request. The example technique can also include determining whether the authentication scheme associated with the indicator is also supported by the authentication service and in response to determining that the authentication scheme associated with the indicator is also supported by the authentication service, initiating an authentication process with the computing service according to the authentication scheme that is supported by both the computing service and the authentication service. As such, the authentication scheme can be dynamically selected at the authentication service for the received authentication request.

20 Claims, 6 Drawing Sheets

(56) References Cited

U.S. PATENT DOCUMENTS

| | | | | |
|---|---|---|---|---|
| 2009/0327812 A1* | 12/2009 | Zhang | ............... | H04W 12/069 |
| | | | | 714/32 |
| 2010/0251345 A1 | 9/2010 | James et al. | | |
| 2016/0316368 A1* | 10/2016 | Gan | ..................... | H04W 12/06 |
| 2018/0367526 A1 | 12/2018 | Huang et al. | | |
| 2020/0125713 A1* | 4/2020 | Davis | ..................... | G06F 21/31 |

OTHER PUBLICATIONS

Gielis, Dimitri, "Facebook, Google and Custom Authentication in the same Oracle APEX 18.1 app", Retrieved from http://dgielis.blogspot.com/2018/06/facebook-google-and-custom.html, Jun. 6, 2018, 8 Pages.

Trivedi, Jignesh, "Token Based Authentication Using ASP.Net Web API, OWIN and Identity with Entity Framework", Retrieved from: https://www.c-sharpcorner.com/UploadFile/ff2f08/token-based-authentication-using-Asp-Net-web-api-owin-and-i/, Jun. 20, 2015, 12 Pages.

Venkataram, et al., "A Dynamic Authentication Scheme for Mobile Transactions", In International Journal of Network Security, vol. 8, Issue 1, Jan. 2009, pp. 59-74.

* cited by examiner

DYNAMIC AUTHENTICATION SCHEME SELECTION IN COMPUTING SYSTEMS

BACKGROUND

Remote or "cloud" computing systems typically utilize large numbers of remote servers housed in datacenters to provide compute, storage, network, and other computing services. The remote servers can be interconnected by computer networks to form one or more computing clusters. Each remote server in the computing clusters can host one or more virtual machines ("VMs"), containers, virtual switches, load balancers, and other types of virtualized components for resource sharing. During operation, the virtual machines or containers can facilitate execution of user applications to provide corresponding computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing facilities, remote servers in cloud computing facilities can provide computing services to multiple subscribers or "tenants" via virtualization of compute, storage, network, or other suitable types of physical resources. For example, a server can execute suitable instructions on an operating system to provide a hypervisor for managing multiple virtual machines hosted at the server. Each virtual machine can execute suitable applications to provide corresponding computing services to users of tenants. As such, multiple tenants can share physical resources as computing services at the individual servers in cloud computing facilities. On the other hand, a single tenant can also consume physical resources from multiple servers, storage devices, or other suitable components of cloud computing facilities as a single computing service.

In certain cloud computing facilities, various computing services can be organized as platform services and microservices that support the platform services. For instance, a platform service can be an email exchange service that is configured to handle email reception, forwarding, synchronization, and other suitable operations. An example email exchange service is Outlook® service included in the Office 365 suite provided by Microsoft Corporation of Redmond, Wash. Upon authenticating to the email exchange service, a user can be allowed to access content such as emails and attachments in corresponding mailboxes. In order to provide such content, the email exchange service can rely on one or more microservices for support. For instance, during operation, a mailbox microservice can authenticate itself and then provide emails to the email exchange service, which in turn can forward the received emails to a client device of the user. In another example, a calendar microservice can be configured to provide content of calendar items, reminders, or other suitable information to the email exchange service.

Cloud computing facilities typically implement an authentication service that is configured to facilitate authentication of microservices to platform services and/or to one another. For instance, an authentication service can be configured to receive an authentication request from a microservice. In response, the authentication service can be configured to validate credentials of the microservice according to an authentication scheme. Upon validation of the credentials, the authentication service can be configured to generate and transmit a security token (or other suitable security articles) to the microservice based on an authentication profile of the microservice. The authentication profile can contain information such as configuration of token acquisition and/or other suitable information. The microservice can then utilize the received security token to authenticate itself to a platform service (or other suitable computing services) in order to provide content to or performing other suitable actions for the platform service.

In certain computing systems, multiple authentication schemes may be deployed. Each authentication scheme can have distinct requirements for credentials, authentication procedures and/or protocols, or other distinct operational characteristics. For example, bearer authentication is an authentication scheme that utilizes data packages called bearer tokens. A bearer token is a cryptic string that is usually generated by a server in response to a token request. A bearer token allows an entity (e.g., a user, a device, or a computing service) presenting the bearer token to access certain computing resources or perform computing operations. Other examples of authentication schemes include Windows authentication, certificate authentication, and container authentication.

Before initiating an authentication process, a microservice, as a client to an authentication service, typically performs an authentication scheme discovery in order to decide on an authentication scheme to use. For instance, a microservice can transmit a discovery request to a discovery interface (e.g., identified by an IP address, Universal Resource Locator or "URL," or other suitable types of network address) of the authentication service. In response, the authentication service provides a discovery response that includes a list of one or more authentication schemes supported by the authentication service as well as corresponding authentication interfaces (referred to as "authentication endpoints") at corresponding IP addresses, URLs, and/or other suitable network addresses. Upon receiving the discovery response, the microservice can then select one of the authentication schemes and initiate an authentication process by transmitting an authentication request to an authentication endpoint of the authentication service corresponding to the selected authentication scheme.

The foregoing client-side authentication scheme selection by the microservices can have several drawbacks. First, the authentication scheme discovery can introduce latency in providing content from the microservice to the platform service. Secondly, as the numbers of microservices increase, the authentication service may be overloaded and requires switching to a new authentication scheme. However, updating each microservice to have an authentication library that conforms to the new authentication scheme may be labor intensive, tedious, and prone to error. In addition, when the authentication service exposes multiple authentication endpoints, the microservices can be overloaded with authentication logic that tracks which authentication endpoint the microservices can call to initiate an authentication process.

Several embodiments of the disclosed technology can address at least several aspects of the foregoing drawbacks of client-side authentication scheme selection by implementing a service-side authentication scheme selection at the authentication service. In certain implementations, the authentication service can be configured to deploy a request monitor for detecting authentication requests from microservices before processing the authentication requests. An example request monitor can include a hypertext transport protocol ("HTTP") listener that is configured as a listening socket with an IP address, a port number, a server name, a default server, or other suitable parameters.

Upon detecting an incoming authentication request from a microservice, the request monitor can be configured to analyze at least a portion of a header and/or payload of the authentication request for indicators or "hints" of which authentication scheme(s) is/are supported by or suitable for the microservice. For example, the authentication request may include an encrypted header containing a value "WinAuthEnabled:true." In response, the authentication service can indicate that Window authentication can be a candidate authentication scheme for processing the received authentication request. In another example, the authentication request can include a JavaScript Object Notation ("JSON") web token. In response, the authentication service can indicate that token authentication can be a candidate authentication scheme for processing the received authentication request. In yet another example, the request monitor can determine that the authentication request does not include a header but instead is signed with a digital certificate and a digital signature is included in a payload of the authentication request. In response, the authentication service can indicate that certificate authentication is a candidate authentication scheme for processing the received authentication request.

In other implementations, the microservice can be configured to access an authentication library containing configuration information of supported authentication schemes by the microservice. The microservice can then be configured to add a header value to the authentication request that indicates a supported authentication scheme, such as "AuthScheme: Windows." Upon receiving the authentication request, the request monitor can extract the authentication scheme supported by the microservice from the header and determine whether the supported authentication scheme is also supported by the authentication service. In response to determine that the authentication scheme is also supported by the authentication service, the request monitor can be configured to actuate a suitable authentication handler to facilitate the authentication process according to the authentication scheme extracted from the header of the authentication request. Otherwise, the request monitor can ignore the extracted authentication scheme and instead, actuate a default authentication handler for facilitating the authentication process with the microservice or transmitting a list of authentication schemes supported by the authentication service for selection by the microservice according to client-side authentication scheme selection.

Several embodiments of the disclosed technology can thus facilitate efficient authentication of computing services, such as microservices to platform services by enabling dynamic authentication scheme selection at the authentication service. Via the request monitor, different authentication schemes can be implemented at the authentication service with a single authentication endpoint. As such, multiple microservices can call the same authentication endpoint even when the microservices are supporting different authentication schemes. Thus, authentication logic implemented at the microservices can be reduced when compared to client-side authentication scheme selection.

The foregoing service-side authentication scheme selection can also allow efficient deployment of new authentication schemes in cloud computing facilities. For instance, a new authentication scheme can be deployed to the authentication service. The new authentication scheme is accessible via the same authentication endpoint as other existing authentication scheme(s). As such, tests of the new authentication scheme may be conducted by providing authentication requests with "hints" that correspond to the new authentication scheme while the same authentication endpoint continues to facilitate authentication processes according to the existing authentication schemes. Upon determining that the new authentication scheme is working properly, authentication processes at the authentication service can be switched to using the new authentication scheme by simply modifying "hints" included in authentication requests from microservices.

DETAILED DESCRIPTION

Figure 1:
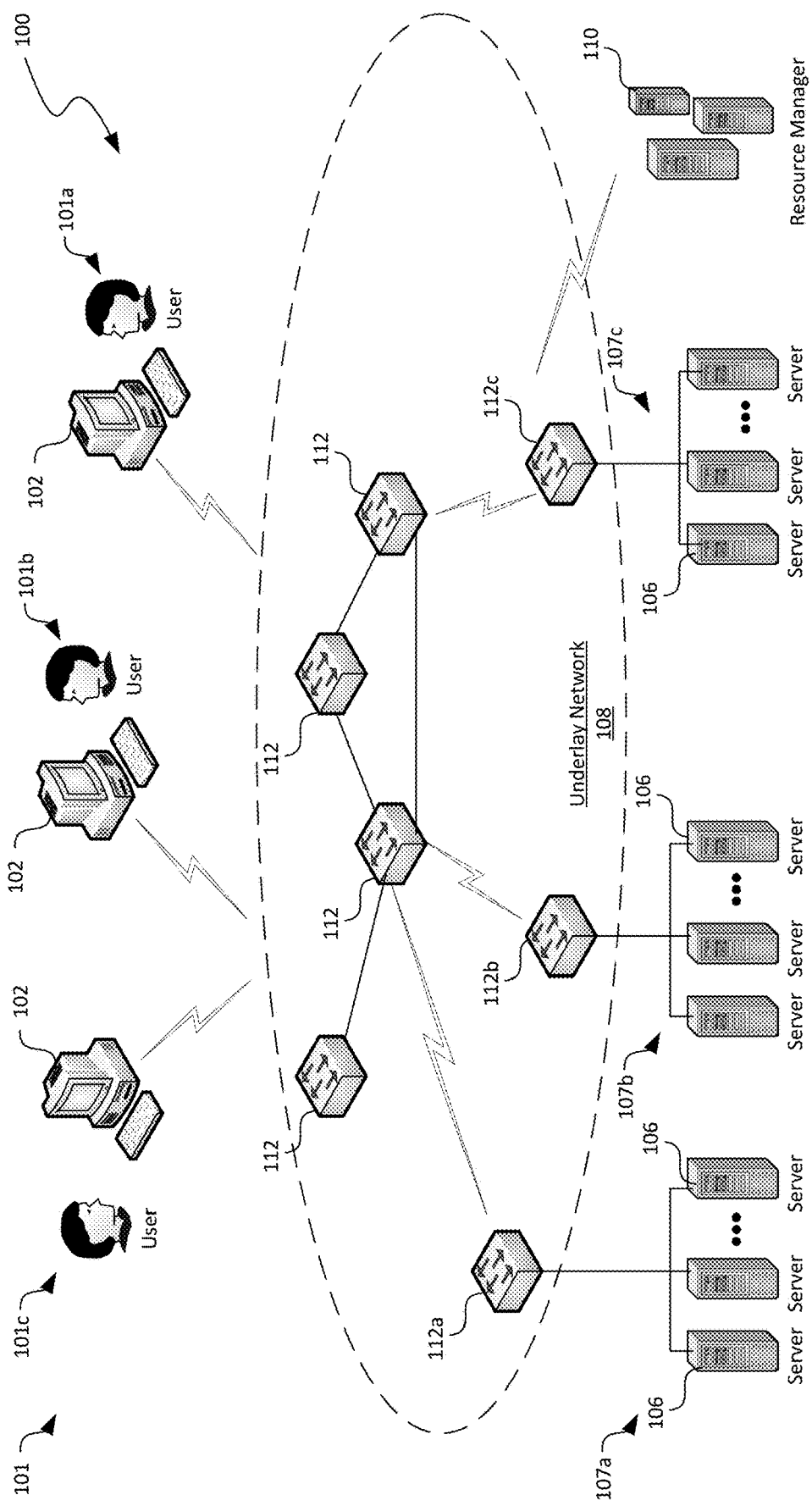
FIG. 1 is a schematic diagram illustrating a distributed computing system implementing dynamic authentication scheme selection in accordance with embodiments of the disclosed technology.

Certain embodiments of systems, devices, components, modules, routines, data structures, and processes for implementing dynamic authentication scheme selection in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term a "distributed computing system" generally refers to a computing facility having a computer network interconnecting a plurality of host machines to one another or to external networks (e.g., the Internet). An example of such a computing facility can include a datacenter for providing cloud computing services. A compute network can include a plurality of network devices. The term "network device" generally refers to a physical network device, examples of which include routers, switches, hubs, bridges, load balancers, security gateways, or firewalls. A "host" can be a server or other suitable types of hardware/software computing device that is configured to provide a hypervisor that supports one or more virtual machines, virtual switches, or other suitable types of virtual components.

As used herein, a "hypervisor" generally refers to computer software, firmware, and/or hardware that creates, manages, and runs one or more virtual machines on a host machine. A "virtual machine" or "VM" is an emulation of a physical computing system using computer software. Different virtual machines can be configured to provide suitable computing environment to execute different processes for the same or different users on a single host machine. During operation, a hypervisor on the host machine can present different virtual machines with a virtual operating platform to hardware resources on the host machine and manages execution of various processes for the virtual machines.

Also used herein, the term "computing service" or "cloud service" generally refers to one or more computing resources provided over a computer network such as the Internet. Example cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, an "authentication scheme" generally refers to a set of distinct requirements for credentials, procedures and/or protocols, or other distinct operational characteristics related to an authentication process. For example, bearer authentication is an authentication scheme that utilizes data packages called bearer tokens. A bearer token is a cryptic string that is usually generated by a server in response to a token request. A bearer token allows an entity (e.g., a user, a device, or a computing service) presenting the bearer token to access certain computing resources or perform computing operations. In another example, Windows authentication (formerly named NTLM, and also referred to as Windows NT Challenge/Response authentication) is an authentication scheme that hashes an entered username and password before sending across a network. In yet another example, certificate authentication uses a digital certificate issued by a trusted certificate authority to identify a user, machine, device, or computing service before granting access to a resource, network, application, etc. Other examples can include container authentication, challenge-handshake authentication, extensible authentication, and other suitable authentication schemes.

Also used herein, an "authentication service" generally refers to a computing service that is configured to facilitate an authentication process upon receiving an authentication request from a requester, such as another computing service. One example authentication service is Security Token Service ("STS"), which is a cross-platform open standard component of a single sign-on infrastructure framework. Within that claim-based identity framework, STS can be responsible for issuing, validating, renewing, and cancelling security tokens. The security tokens issued by STS can then be used to identify a holder (e.g., a computing service) of the security token to other computing services for accessing resources and/or performing suitable actions.

A "security token," "access token," or "token" generally refers to a digital data package that contains security credentials for a login session and identifies an entity, a group of the entity, privilege(s) of the entity, and, in some cases, a particular application. Example security tokens can include a string of random characters that is composed of various fields and values thereof, such as an identifier, an identification of a logon session, a user identifier, a default owner, and/or other suitable fields.

Further used herein, an "authentication interface" or "authentication endpoint" generally refers to an access point for calling an authentication service. The access point can be identified by an IP address, a port number, a server name, a default server, or other suitable parameters identifying a network location of the access point. For example, an authentication endpoint can be identified by the following URL:

http://131.107.72.15/Security_Federation_SecurityTokenService_Symmetric.svc

In cloud computing facilities, authenticating a computing service to another can involve obtaining a security token from an authentication service. However, before issuing a security token, the authentication service may require a requesting computing service to authenticate itself according to an authentication scheme. As such, before initiating an authentication process, a computing service typically performs an authentication scheme discovery in order to decide on an authentication scheme to use. For instance, the computing service can transmit a discovery request to the authentication service. In response, the authentication service provides a discovery response that includes a list of one or more authentication schemes supported by the authentication service as well as corresponding authentication interfaces. Upon receiving the discovery response, the computing service can then select one of the authentication schemes and initiate an authentication process by transmitting an authentication request to an authentication interface of the authentication service corresponding to the selected authentication scheme.

Having the requesting computing service selecting the authentication scheme can have several drawbacks. First, the authentication scheme discovery can introduce latency when computing devices interact with one another. Secondly, as the numbers of computing services increase, the authentication service may be overloaded and requires switching to a new authentication scheme. However, updating each computing service to have an authentication library that conforms to the new authentication scheme may be labor intensive, tedious, and prone to error. In addition, when the authentication service exposes multiple authentication interfaces, computing services can be overloaded with authentication logic that tracks which authentication interface the computing service can call to initiate an authentication process.

Several embodiments of the disclosed technology can address at least several aspects of the foregoing drawbacks by implementing a service-side authentication scheme selection at the authentication service. In certain implementations, the authentication service can be configured to deploy a request monitor for detecting authentication requests from microservices before processing the authentication requests. Upon detecting an incoming authentication request from a microservice, the request monitor can be configured to analyze at least a portion of a header and/or payload of the authentication request for indicators or "hints" of which authentication scheme(s) is/are supported by or suitable for the microservice. Based on the "hints," the authentication service can indicate that a particular authentication scheme can be used for processing the received authentication request. Several embodiments of the disclosed technology can thus facilitate efficient authentication of computing services by enabling dynamic authentication scheme selection at the authentication service, as described in more detail below with reference to FIGS. 1-6.

FIG. 1 is a schematic diagram illustrating a distributed computing system 100 having hosts implementing sharable link for remote computing resource access in accordance with embodiments of the disclosed technology. As shown in FIG. 1, the distributed computing system 100 can include a computer network (shown as an "underlay network 108") interconnecting a plurality of host machines shown as servers 106, a plurality of client devices 102 of users 101, and a resource manager 110 to one another. The resource manager 110 can be a cluster controller, a fabric controller, a database controller, and/or other suitable types of controller configured to monitor and manage resources and operations of the servers 106 and/or other components in the distributed computing system 100. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple servers 106 and the client devices 102. In certain embodiments, the servers 106 can be organized into racks, action zones, groups, sets, or other suitable divisions. For example, in the illustrated embodiment, the servers 106 are grouped into three clusters identified individually as first, second, and third clusters 107a-107c. In the illustrated embodiment, each of the clusters 107a-107c is operatively coupled to a corresponding network device 112a-112c, respectively, which are commonly referred to as "top-of-rack" or "TOR" network devices. The TOR network devices 112a-112c can then be operatively coupled to additional network devices 112 to form a network in a hierarchical, flat, mesh, or other suitable types of topology. The computer network can allow communications among the servers 106 and the client devices 102. In other embodiments, the multiple host machine sets 107a-107c can share a single network device 112 or can have other suitable arrangements.

The servers 106 can individually be configured to provide computing, storage, and/or other suitable cloud computing services to the individual users 101. For example, as described in more detail below with reference to FIG. 2, each of the servers 106 can initiate and maintain one or more virtual machines 144 (shown in FIG. 2) upon requests from the users 101. The users 101 can then utilize the instantiated virtual machines 144 to execute suitable processes for performing computation, communication, and/or other suitable tasks. In certain embodiments, one of the servers 106 can provide virtual machines 144 for multiple users 101. In other embodiments, multiple servers 106 can host virtual machines 144 for one or more users 101a-101c.

The client devices 102 can each include a computing device that facilitates corresponding users 101 or administrator 104 to access computing services provided by the servers 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable numbers of users 101 or administrators to access cloud and/or other suitable types of computing services provided by the servers 106 and/or other components in the distributed computing system 100.

Figure 2:
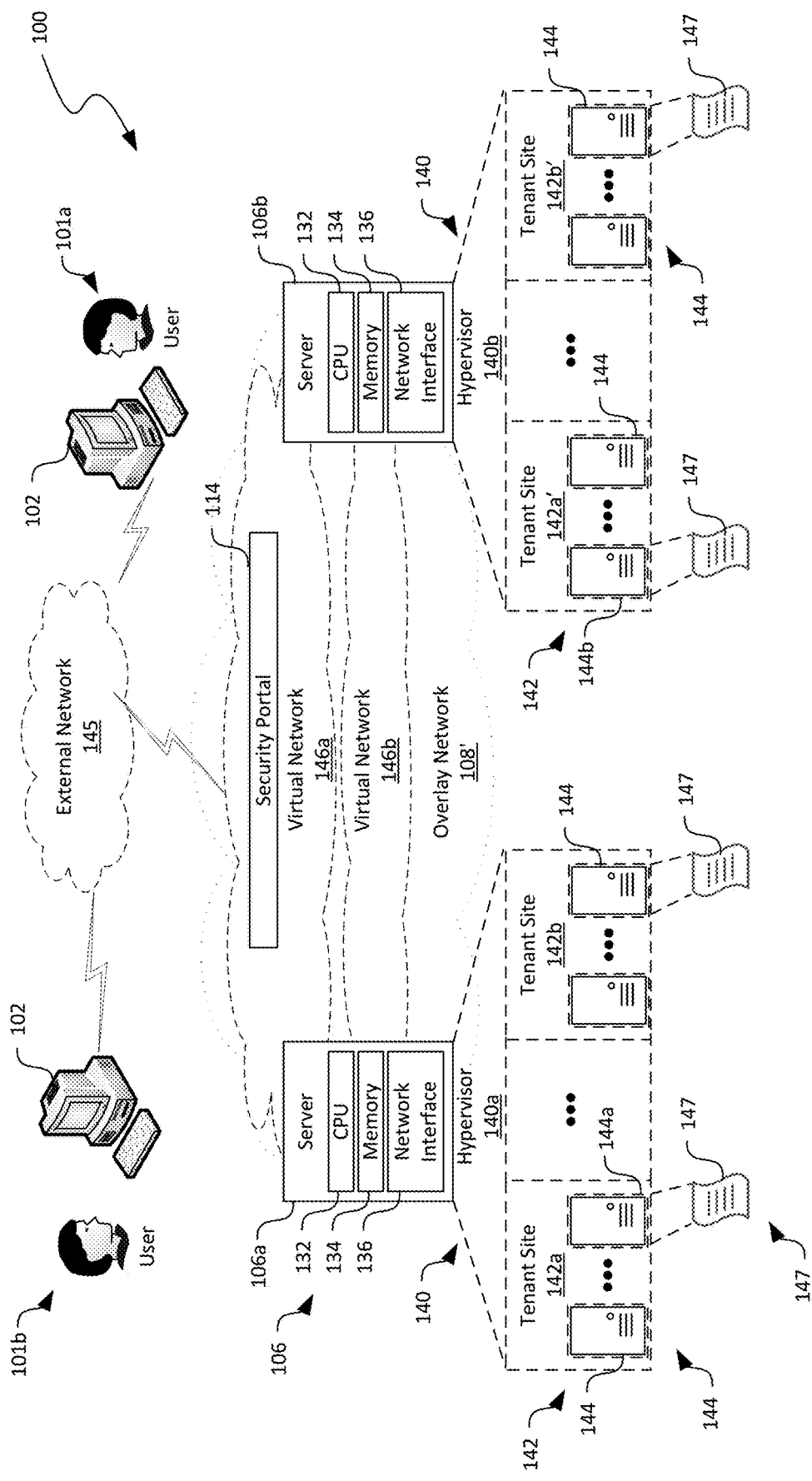
FIG. 2 is a schematic diagram illustrating certain hardware and software components of the distributed computing system of FIG. 1 in accordance with embodiments of the disclosed technology.

FIG. 2 is a schematic diagram illustrating an overlay network 108' that can be implemented on the underlay network 108 in FIG. 1 in accordance with embodiments of the disclosed technology. In FIG. 2, only certain components of the underlay network 108 of FIG. 1 are shown for clarity. As shown in FIG. 2, the first server 106a and the second server 106b can each include a CPU 132, a memory 134, and a network interface 136 operatively coupled to one another. The CPU 132 can include one or more processors, microprocessors, field-programmable gate arrays, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the CPU 132 (e.g., instructions for performing the methods discussed below with reference to FIGS. 5A and 5B). The network interface 136 can include a network interface card, a connection converter, and/or other suitable types of input/output devices configured to accept input from and provide output to other components on the overlay networks 108'.

The first server 106a and the second server 106b can individually contain instructions in the memory 134 executable by the CPU 132 to cause the individual servers 106a and 106b to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first server 106a can provide a first hypervisor 140a that manages first and second tenant sites 142a and 142b, respectively. The second server 106b can provide a second hypervisor 140b that manages first and second tenant sites 142a' and 142b', respectively. The hypervisors 140 are individually shown in FIG. 2 as software components. However, in other embodiments, the hypervisors 140 can also include firmware and/or hardware components.

The tenant sites 142 can each include multiple virtual machines 144 for a particular tenant. For example, the first server 106a and the second server 106b can both host the tenant site 142a and 142a' for a first user 101a. The first server 106a and the second server 106b can both host the tenant site 142b and 142b' for a second user 101b. Each virtual machine 144 can be executing applications or processes 147 corresponding to an operating system, middleware, and/or suitable applications. The executed applications or processes 147 can each correspond to one or more computing services or other suitable types of computing services. Examples of such computing services can include platform services, microservices, authentication services, as discussed in more detail below with reference to FIGS. 3A and 3B.

Also shown in FIG. 2, the computing system 100 can include an overlay network 108' having one or more virtual networks 146 that interconnect the tenant sites 142a and 142b across the first and second servers 106a and 106b. For example, a first virtual network 146a interconnects the first tenant sites 142a and 142a' at the first server 106a and the second server 106b. A second virtual network 146b interconnects the second tenant sites 142b and 142b' at the first server 106a and the second server 106b. Even though a single virtual network 146 is shown as corresponding to a single tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different servers 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a particular virtual network 146. Thus, different virtual networks 146 can use one or more virtual network addresses that are the same. Example virtual network addresses can include IP addresses, MAC addresses, and/or other suitable addresses.

In operation, the servers 106 can facilitate communications among the virtual machines and/or applications executing in the virtual machines 144. For example, the CPU 132 of the first server 106a can execute suitable network communication operations to facilitate the first virtual machine 144a to transmit packets to the second virtual machine 144b via the virtual network 146a by traversing the network interface 136 on the first server 106a, the underlay network 108 (FIG. 1), and the network interface 136 on the second server 106b. As such, the first virtual machine 144a of a tenant site 142a on the first server 106a can cooperate with another virtual machine 144b on another server 106b to execute suitable applications or processes 147 in order to provide suitable computing services to the users 101.

Figure 3A:
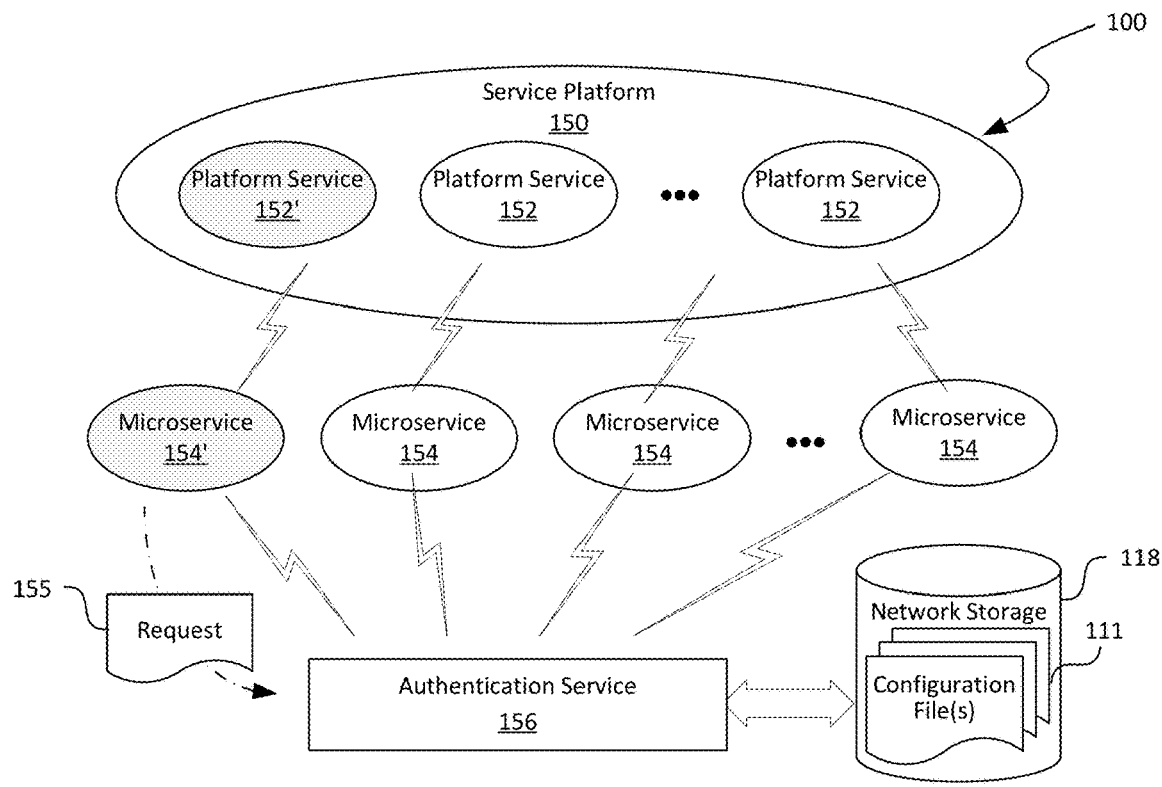
FIGS. 3A and 3B are schematic block diagrams illustrating an example organization of computing services provided in the distributed computing system during operation in accordance with embodiments of the present technology.
Figure 3B:
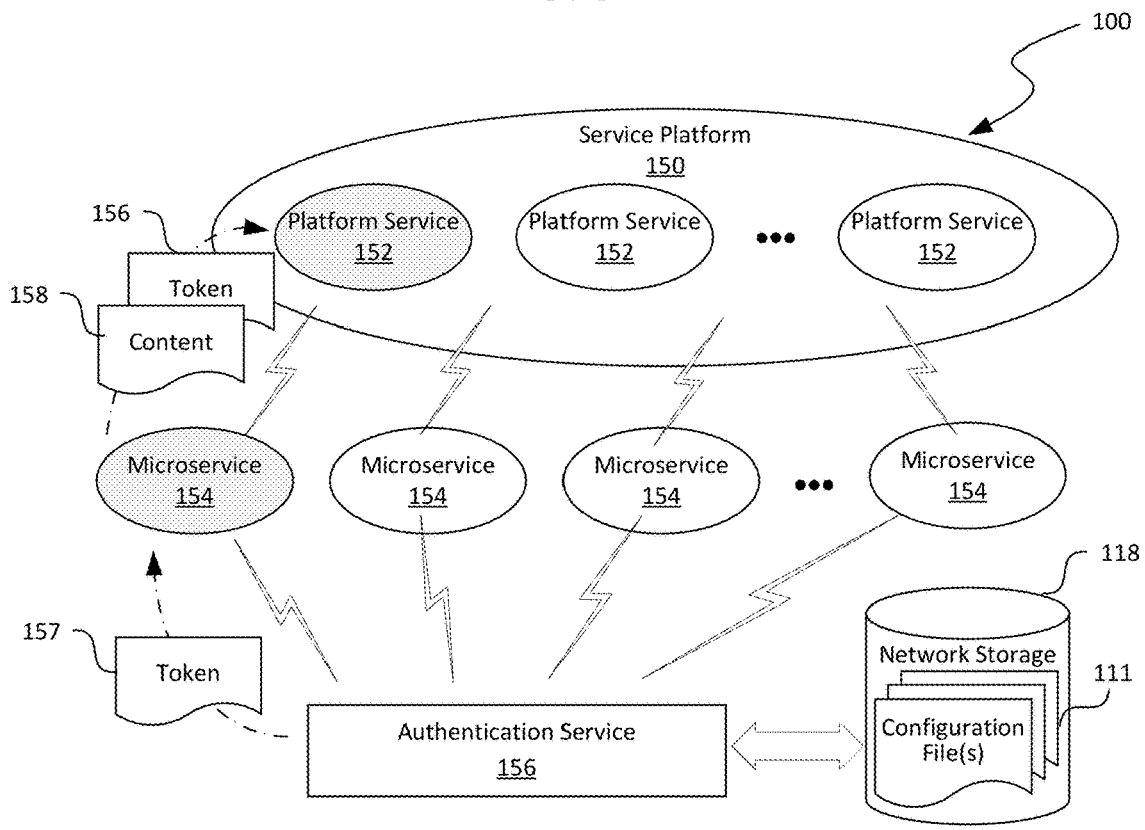

FIGS. 3A and 3B are schematic block diagrams of the distributed computing system 100 having an authentication service 156 configured for dynamic authentication scheme selection in accordance with embodiments of the present technology. In FIGS. 3A and 3B and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 3A, the distributed computing system 100 can be configured to provide computing services organized as a collection of platform services 152 in a service platform 150 and microservices 154 that are configured to support the platform services 152. For instance, a platform service 152' can be an email exchange service that is configured to handle email reception, forwarding, synchronization, and other suitable operations. An example email exchange service is Outlook® service included in the Office 365 suite provided by Microsoft Corporation of Redmond, Wash. Upon authenticating to the email exchange service, a user 101 (FIG. 1) can be allowed to access content such as emails and attachments in corresponding mailboxes. In order to provide such content, the email exchange service can rely on one or more microservices 154 for support. For instance, the email exchange service can rely on a mailbox microservice (shown as 154' in FIG. 3A) for emails or other suitable types of content.

To facilitate operations between pairs of the platform services 152 and the microservices 154, the distributed computing system 100 can also provide an authentication service 156 operatively coupled to a network storage 118 containing configuration files 111. The configuration files 111 can individually contain information such as configuration of token acquisition and/or other suitable information. During operation, the authentication service 156 can be configured to receive a request 155 from a microservice 154 for a security token 157 (shown in FIG. 3B). In response, the authentication service 156 can be configured to analyze the received request 155 for indicators or "hints" of one or more authentication schemes supported by the microservice 154'. The authentication service 156 can then be configured to select an authentication scheme that is supported by both the microservice 154 and the authentication service 156 based on the "hints" and an authentication profile of the authentication service 156 and/or the microservice 154. Example operations of analyzing the received request 155 for "hints" are discussed in more detail below with reference to FIGS. 4A and 4B.

As shown in FIG. 3B, the authentication service 156 can then be configured to initiate an authentication process with the microservice 152 in order to validate credentials of the microservice 154 according to the selected authentication scheme. Upon validation of the credentials, the authentication service 156 can be configured to generate and transmit a token 156 (or other suitable security articles) to the microservice 154. The microservice 154 can then utilize the received token 155 to authenticate itself to a platform service 152 (or other suitable computing services) in order to provide content 158 to or performing other suitable actions for the platform service 152. In turn, the platform service 152 can forward the received content to a client device 102 (FIG. 1) of the user 101.

Figure 4A:
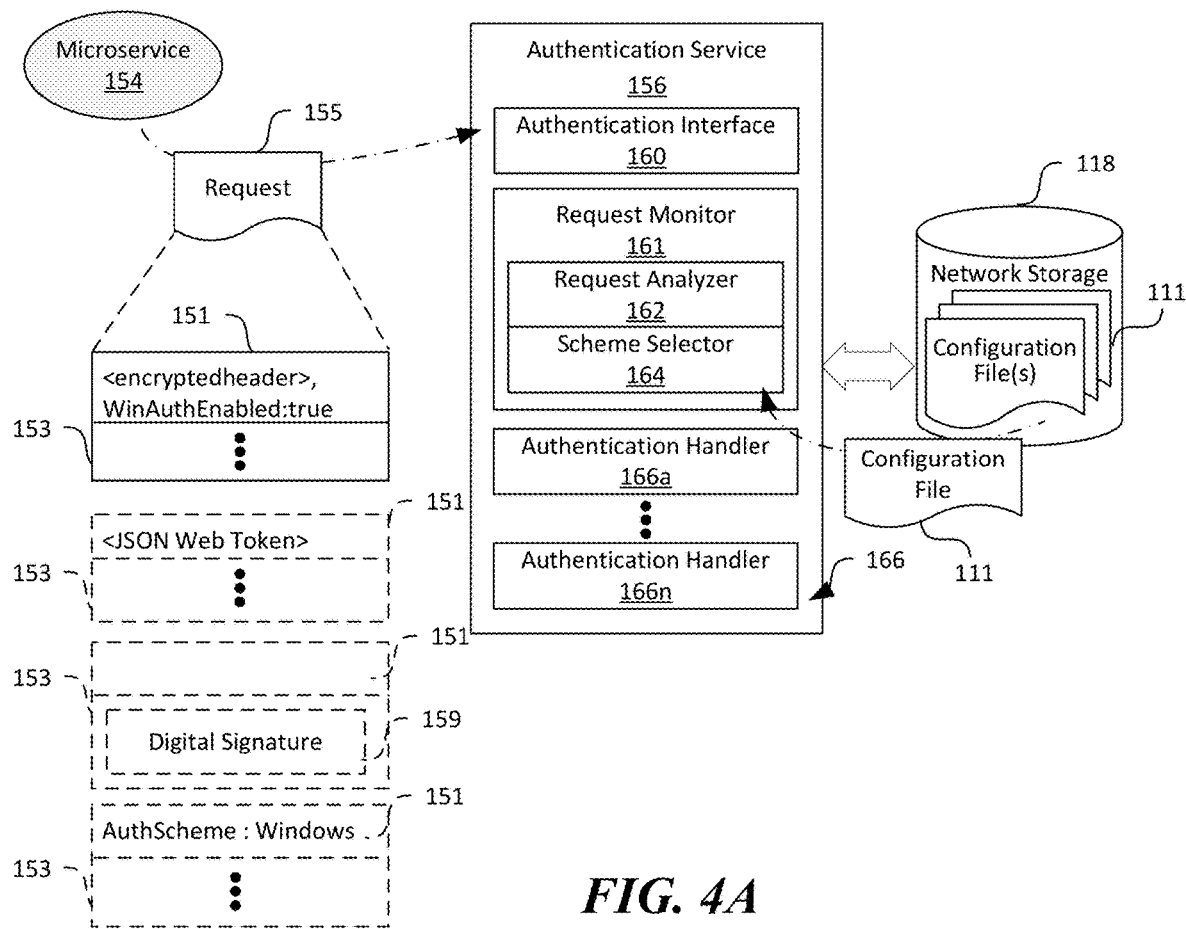
FIGS. 4A and 4B are schematic block diagrams illustrating dynamic authentication scheme selection in the distributed computing system in accordance with embodiments of the present technology.
Figure 4B:
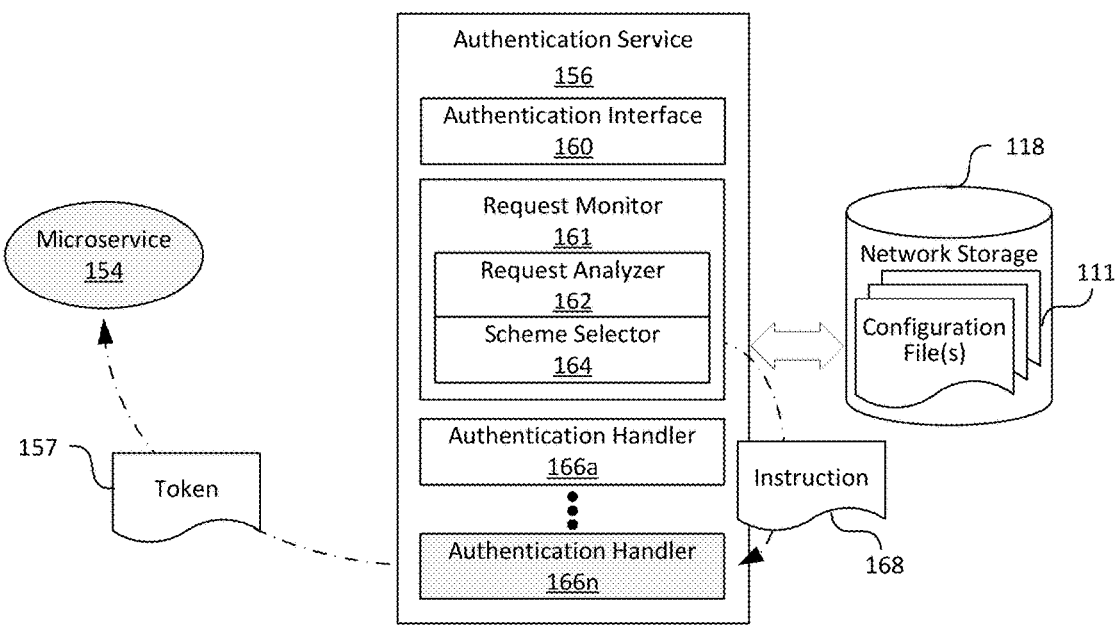

FIGS. 4A and 4B are schematic block diagrams illustrating dynamic authentication scheme selection in the distributed computing system 100 in accordance with embodiments of the present technology. As shown in FIG. 4A, the authentication service 156 can include an authentication interface 160, a request monitor 161, and one or more authentication handler 166 operatively coupled to one another. Though the foregoing components of the authentication service 156 are shown in FIG. 4A for illustration purposes, in other embodiments, the authentication service 156 can include additional and/or different components.

The authentication interface 160 can be configured to receive a request 155 for a security token 157 from a microservice 154. In one implementation, request 155 can be configured as an HTTP request having a header 151 and a payload 153. In other implementations, the request 155 can be configured as other suitable types of digital data packages. Upon receiving the request 155, the authentication interface 160 can be configured to perform error checking/correction and/or other suitable message processing operations before forwarding the request 155 to the request monitor 161 for further processing.

As shown in FIG. 4A, the request monitor 161 can include a request analyzer 162 and a scheme selector 164 operatively coupled to one another. The request analyzer 162 can be configured to analyze the received request 155 for one or more indicators or "hints" that the microservice 154 supports an authentication scheme. Various analysis techniques may be utilized by the request analyzer 162. For instance, the request analyzer 162 can be configured to parse at least a portion of the header 151 or the payload 153 of the request 155 and determine whether certain header field and/or corresponding values are present. Based on such determination, the request analyzer 161 can be configured to indicate a candidate authorization scheme supported by the microservice 154 to the scheme selector 164.

Several examples of such header fields and/or values are illustrated in FIG. 4A. For example, the request 155 may include an encrypted header containing a value "WinAuthEnabled:true." In response, the request analyzer 161 can indicate that Window authentication can be a candidate authentication scheme for processing the received request 155. In another example, the request 155 can include a JavaScript Object Notation ("JSON") web token (shown in phantom line for clarity). In response, the request analyzer 161 can indicate that token authentication can be a candidate authentication scheme for processing the received request 155. In yet another example, the request analyzer 161 can determine that the request 155 does not include a header but instead is signed with a digital certificate and a digital signature 159 is included in a payload 153 of the request 155. In response, the request analyzer 161 can indicate that certificate authentication is a candidate authentication scheme for processing the received request 155.

In other implementations, the microservice 154 can also be configured to access an authentication library (not shown) containing configuration information of supported authentication schemes by the microservice 154. The microservice 154 can then be configured to add a header value to the request 155 that indicates a supported authentication scheme, such as "AuthScheme: Windows," as shown in FIG. 4A. Upon receiving the request 155, the request analyzer 161 can extract the authentication scheme supported by the microservice 154 from the header 151 and indicate that the extracted authentication scheme is a candidate for processing the request 155.

Based on the indications from the request analyzer 162, the scheme selector 164 can be configured to determine whether the candidate authentication scheme is also supported by the authentication service 156. For example, the scheme selector 164 can be configured to access the network storage 118 containing the configuration files 111 to identify one or more authentication schemes supported by the authentication service 156. The scheme selector 164 can then be configured to determine whether the authentication scheme of the indicator matches one of one or more authentication schemes supported by the authentication service 156. In response to determine that the candidate authentication scheme is also supported by the authentication service 156, the scheme selector 164 can be configured to actuate a suitable authentication handler 166 by issuing an instruction 168 to facilitate the authentication process according to the identified authentication scheme to the authentication handler 166, as shown in FIG. 4B. Upon successful authentication, the authentication handler 166 can be configured to provide the requested token 157 to the microservice 154.

In response to determine that the candidate authentication scheme is not supported by the authentication service 156, in one embodiment, the scheme selector 164 can ignore the extracted authentication scheme and instead actuate a default authentication handler 166 for facilitating the authentication process with the microservice 154. In another embodiment, the scheme selector 164 or other suitable components of the authentication service 156 can be configured to transmit a list of authentication schemes supported by the authentication service 156 for selection by the microservice 154 according to client-side authentication scheme selection.

Several embodiments of the disclosed technology can thus facilitate efficient authentication of computing services, such as microservices 154 to platform services 152 by enabling dynamic authentication scheme selection at the authentication service 156. Via the request monitor 161, different authentication schemes can be implemented at the authentication service 156 with a single authentication interface 160. As such, multiple microservices 154 can call the same authentication interface 160 even when the microservices 154 are supporting different authentication schemes. Thus, authentication logic implemented at the microservices 154 can be reduced when compared to client-side authentication scheme selection.

The foregoing service-side authentication scheme selection can also allow efficient deployment of new authentication schemes. For instance, a new authentication scheme can be deployed to the authentication service 156. The new authentication scheme is accessible via the same authentication interface 160 as other existing authentication scheme(s). As such, tests of the new authentication scheme may be conducted by providing authentication requests with "hints" that correspond to the new authentication scheme while the same authentication interface 160 continues to facilitate authentication processes according to the existing authentication schemes. Upon determining that the new authentication scheme is working properly, authentication processes at the authentication service 156 can be switched to using the new authentication scheme by simply modifying "hints" included in authentication requests from microservices 154.

Figure 5A:
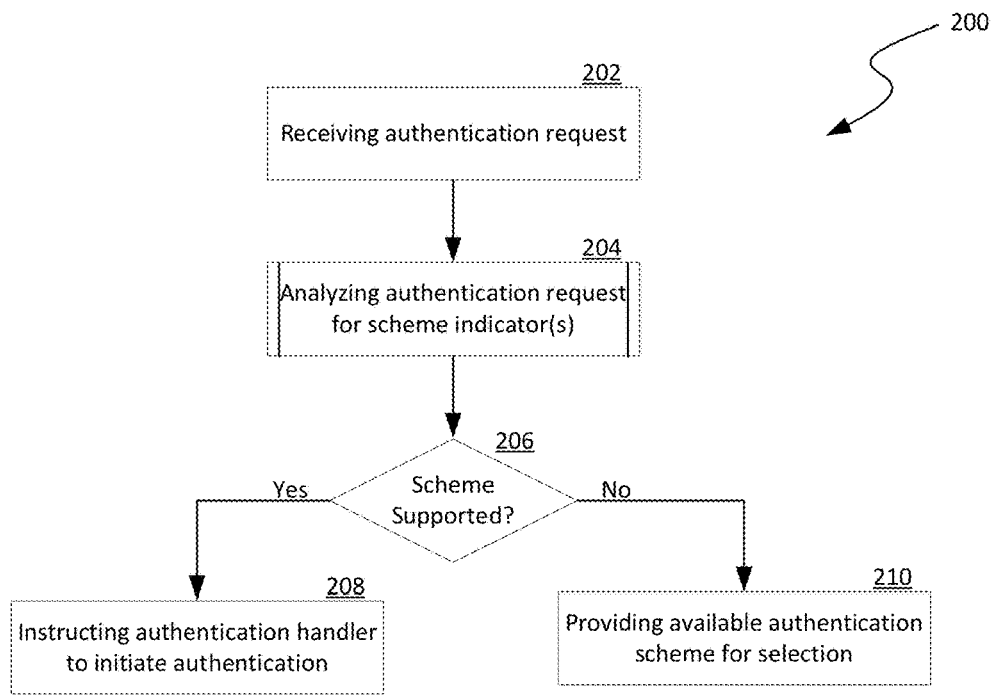
FIGS. 5A and 5B are flow diagrams illustrating aspects of processes for implementing dynamic authentication scheme selection in accordance with embodiments of the present technology.
Figure 5B:
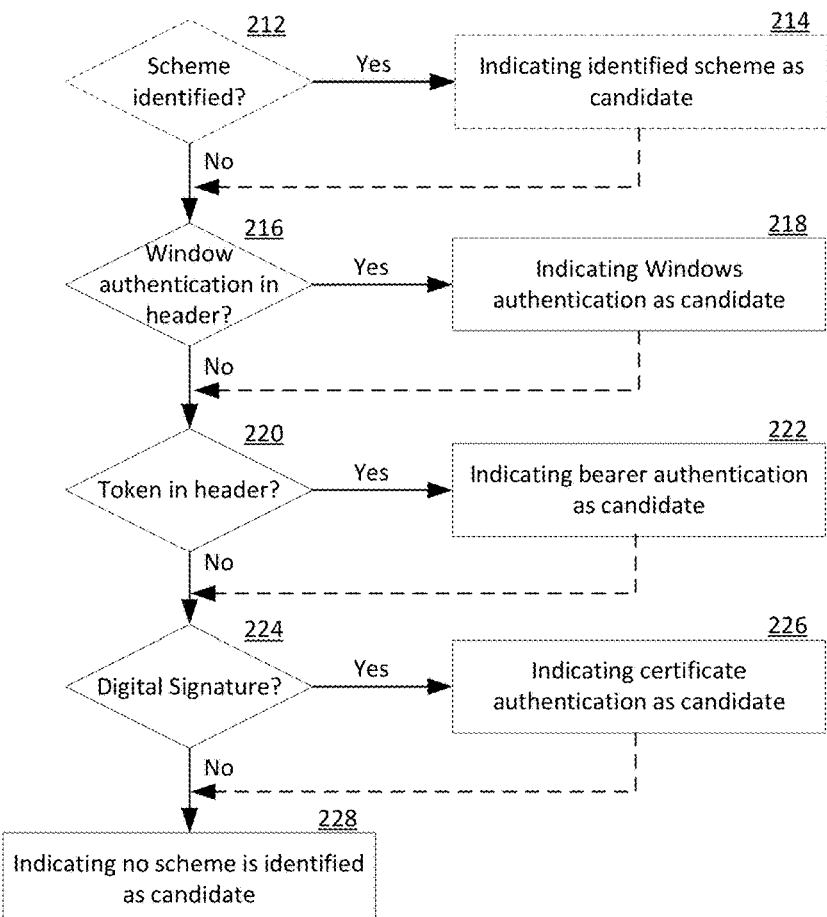

FIGS. 5A and 5B are flow diagrams illustrating aspects of processes for implementing dynamic authentication scheme selection in accordance with embodiments of the present technology. Even though various aspects of the processes are described below in the context of the distributed computing system 100 in FIGS. 1-4B, in other embodiments, various aspects of the processes can also be implemented in computing systems with additional and/or different components.

As shown in FIG. 5A, a process 200 can include receiving an authentication request at an authentication service at stage 202. The process 200 can then include analyzing the received authentication request for one or more scheme indicators or "hints" at stage 204. Example operations of analyzing the received authentication request for candidate authentication schemes are discussed in more detail below with reference to FIG. 5B. The process 200 can then include a decision stage 206 to determine whether an indicated candidate scheme is also supported by the authentication service. In response to determining that the indicated candidate scheme is also supported by the authentication service, the process 200 can proceed to instructing an authentication handler to initiate an authentication process in response to the received authentication request at stage 208. In response to determining that indicated candidate scheme is not supported by the authentication service, the process 200 can proceed to providing available authentication scheme for selection in response to the received authentication request at stage 210, or perform other suitable operations as discussed above with reference to FIGS. 4A and 4B.

FIG. 5B illustrates example operations of analyzing a received authentication request for scheme indicators. As shown in FIG. 5B, the operations can include an optional decision stage 212 to determine whether the received authentication request includes a scheme identified by a sender (e.g., the microservices 154 in FIG. 3A). In response to determining that the received authentication request includes a scheme identified by the sender, the operations can include indicating that the identified scheme as a candidate scheme at stage 214. The operations proceed to another decision stage 216 to determine whether Window authentication is included in a header of the received authentication request. In response to determining that Window authentication is included in a header of the received authentication request, the operations can proceed to indicating that Window authentication is a candidate scheme at stage 218. The operations can then proceed to another decision stage 220 to determine whether a token is included in a header of the received authentication request. In response to determining that a token is included in the received authentication request, the operations can proceed to indicating that bearer authentication is a candidate scheme at stage 222. The operations can then proceed to yet another decision stage 224 to determine whether the received authentication request includes a digital signature. In response to determining that the received authentication request includes a digital signature, the operations can proceed to indicating that certificate authentication is a candidate scheme at stage 226. In response to a negative determination at all of the decision stages 216, 220, and 224, the operations can proceed to indicating that no scheme is identified as a candidate scheme for processing the authentication request at stage 228.

Figure 6:
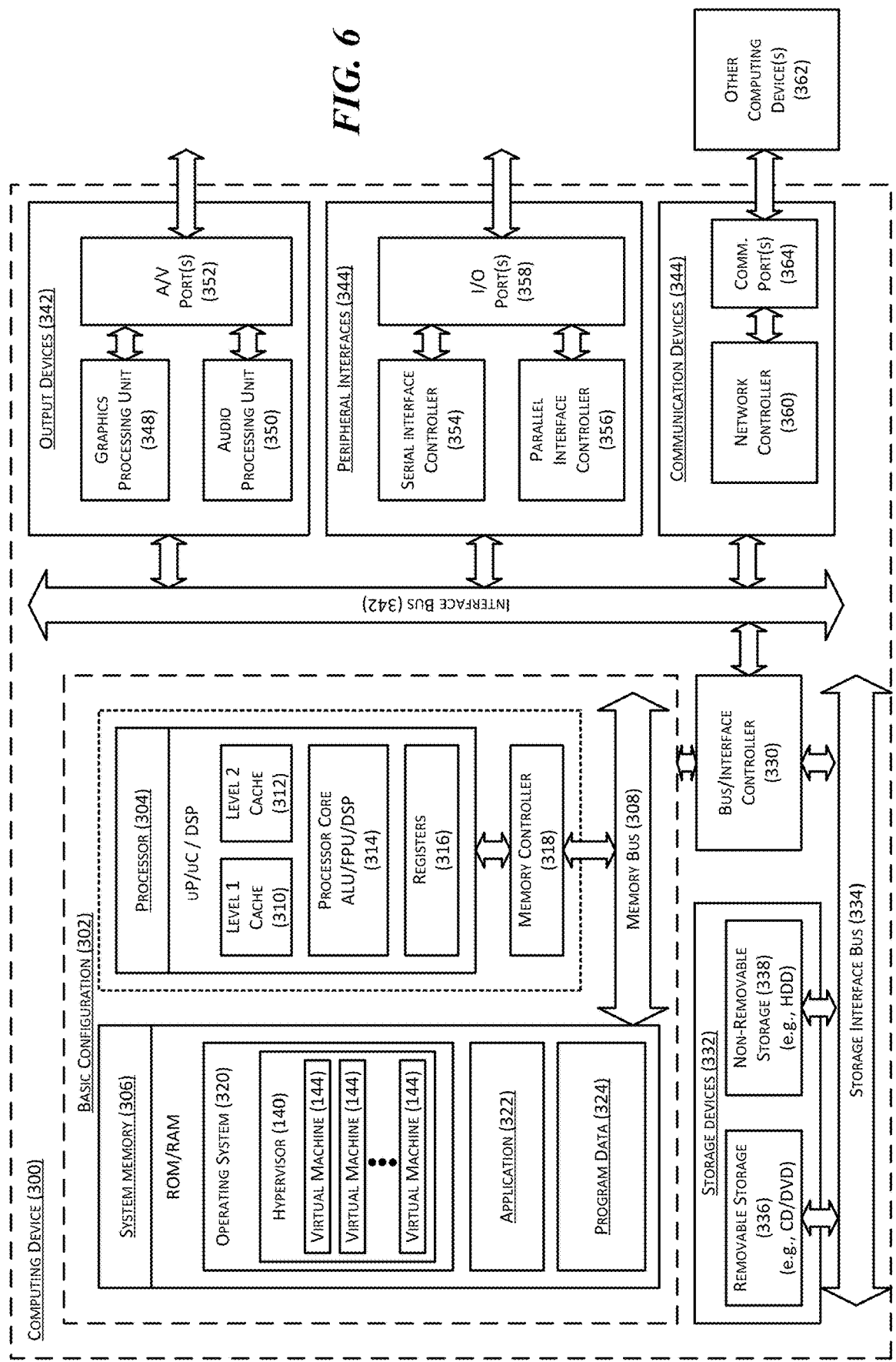
FIG. 6 is a computing device suitable for certain components of the distributed computing system in FIG. 1.

FIG. 6 is a computing device 300 suitable for certain components of the distributed computing system 100 in FIG. 1, for example, the server 106, the client device 102, or the resource manager 110. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 7, the operating system 320 can include a hypervisor 140 140 for managing one or more virtual machines 144. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of dynamic authentication scheme selection in a distributed computing system executing instructions to provide an authentication service, the method comprising:
   receiving, at the authentication service, data representing an authentication request from a computing service;
   analyzing, at the authentication service, the received data representing the authentication request for an indicator of an authentication scheme that is supported by the computing service submitting the authentication request;
   determining, at the authentication service, whether the authentication scheme of the indicator matches one of one more authentication schemes supported by the authentication service;
   in response to determining that the authentication scheme that is supported by the computing service matches an authentication scheme supported by the authentication service,
      initiating, with the authentication service, an authentication process with the computing service according to the authentication scheme that is supported by both the computing service and the authentication service;
   authenticating the authentication request, from the computing service, using the initiated authentication process; and
   upon successful authentication of the authentication request, transmitting, from the authentication service, a security token to the computing service useful for authenticating the computing service to other computing services in the distributed computing system, thereby dynamically selecting the authentication scheme from the one or more authentication schemes supported at the authentication service for providing the security token in response to the received authentication request.

2. The method of claim 1, further comprising:
   accessing, with the authentication service, a database containing records of authentication configuration indicating the one or more authentication schemes supported by the authentication service; and
   wherein determining, at the authentication service, whether the authentication scheme of the indicator matches one of one or more authentication schemes supported by the authentication service includes determining, at the authentication service, whether the authentication scheme of the indicator matches one of one or more authentication schemes supported by the authentication service based on the records of authentication configuration of the authentication service.

3. The method of claim 1, wherein receiving the data representing the authentication request from the computing service includes receiving the data representing the authentication request from the computing service at an authentication interface of the authentication service that is configured to facilitate the initiated authentication process with the computing service irrespective of the authentication scheme according to which the authentication process is initiated.

4. The method of claim 1, wherein analyzing, at the authentication service, the received data representing the authentication request includes:
   parsing, at the authentication service, a header of the authentication request;
   determining, at the authentication service, whether the parsed header contains a value representing an indication that Windows authentication is enabled; and
   in response to determining that the parsed header contains a value representing an indication that Windows authentication is enabled, indicating, at the authentication service, that the computing service supports Windows authentication.

5. The method of claim 1, wherein analyzing, at the authentication service, the received data representing the authentication request includes:
   parsing, at the authentication service, a header of the authentication request;
   determining, at the authentication service, whether the parsed header contains a value representing an indication that an authentication token is included with the authentication request; and
   in response to determining that the parsed header contains a value representing an indication that an authentication token is included with the authentication request, indicating, at the authentication service, that the computing service supports bearer authentication.

6. The method of claim 1, wherein analyzing, at the authentication service, the received data representing, the authentication request includes:
   parsing, at the authentication service, a payload of the authentication request;
   based on the parsed payload, determining, at the authentication service, whether the authentication request is digitally signed with a digital signature; and
   in response to determining that the authentication request is digitally signed with a digital signature, indicating, at the authentication service, that the computing service supports certificate authentication.

7. The method of claim 1, wherein analyzing, at the authentication service, the received data representing the authentication request includes:
    parsing, at the authentication service, a header of the authentication request;
    determining, at the authentication service, whether the header of the authentication request contains an authentication scheme selected by the computing service; and
    in response to determining that the authentication request contains an authentication scheme selected by the computing service, indicating, at the authentication service, that the computing service supports the authentication scheme selected by the computing service.

8. The method of claim 1, wherein:
    the authentication request is formatted as a Hypertext Transport Protocol (HTTP) packet;
    analyzing, at the authentication service, the received data representing the authentication request includes analyzing, at the authentication service, the received HTTP packet of the authentication request with an HTTP listener of the authentication service; and
    initiating, with the authentication service, the authentication process includes:
        selecting, at the authentication service, an authentication handler corresponding to the authentication scheme that is supported by both the computing service and the authentication service; and
        instructing the selected authentication handler to initiate the authentication process with the computing service.

9. The method of claim 1, wherein:
    the authentication request is a first authentication request;
    the authentication scheme is a first authentication scheme;
    the computing service comprises a first computing service hosted by a cloud service provider;
    the method further includes, upon receiving a second authentication request from a second computing service,
        analyzing, at the authentication Service, the received second authentication request for an indicator of a second authentication scheme that is supported by the second computing service, the second authentication scheme being different than the first authentication scheme;
        determining, at the authentication service, whether the second authentication scheme is supported by the authentication service; and
        in response to determining that the second authentication scheme is supported by the authentication service,
    initiating, with the authentication service, another authentication process with the second computing service according to the second authentication scheme; and
    upon successful authentication, transmitting, from the authentication service, another security token to the second computing service useful for authenticating the second computing service to other computing services in the distributed computing system.

10. A computing device in a distributed computing system, the computing device comprising:
    a processor; and
    a memory operatively coupled to the processor, the memory containing instructions executable by the processor, wherein the instructions, when executed, cause the computing device to:
        provide an authentication service in the distributed computing system;
        receive, at the authentication service provided by the computing device, an authentication request from a computing service;
        dynamically select a particular authentication scheme, from multiple authentication schemes supported at the authentication service for the received authentication request, by analyzing, with the authentication service, the received authentication request for an indicator that the particular authentication scheme is supported by the computing service submitting the authentication request;
        initiate, with the authentication service, an authentication process with the computing service according to the particular authentication scheme that is supported by both the computing service and the authentication service;
        authenticate the authentication request, from the computing service, based on the initiated authentication process; and
        based on successful authentication of the authentication request, transmit, from the authentication service to the computing service, authentication data configured to authenticate the computing service to another computing service in the distributed computing system.

11. The computing device of claim 10, wherein the authentication request is received from the computing service at an authentication interface of the authentication service that is configured to facilitate the initiated authentication process with the computing service irrespective of the authentication scheme according to which the authentication process is initiated.

12. The computing device of claim 10, wherein the instructions, when executed, cause the computing device to:
    parse, with the authentication service, a header of the authentication request;
    determine, with the authentication service, whether the parsed header contains a value representing an indication that Windows authentication is enabled; and
    in response to determining that the parsed header contains a value representing an indication that Windows authentication is enabled, indicate, with the authentication service, that the computing service supports Windows authentication.

13. The computing device of claim 10, wherein the instructions when executed, cause the computing device to:
    parse, with the authentication service, a header of the authentication request;
    determine, with the authentication service, whether the parsed header contains a value representing an indication that an authentication token is included with the authentication request; and
    in response to determining that the parsed header contains a value representing an indication that an authentication token is included with the authentication request, indicate, with the authentication service, that the computing service supports bearer authentication.

14. The computing device of claim 10, wherein the instructions, when executed, cause the computing device to:
    parse, with the authentication service, a payload of the authentication request;
    based on the parsed payload, determine, with the authentication service, whether the authentication request is digitally signed with a digital signature; and
    in response to determining that the authentication request is digitally signed with a digital signature, indicate, with the authentication service, that the computing service supports certificate authentication.

15. The computing device of claim 10, wherein the instructions, when executed, cause the computing device to:
parse, with the authentication service, a header of the authentication request;
determine, with the authentication service, whether the header of the authentication request contains an authentication scheme selected by the computing service; and
in response to determining that the authentication request contains an authentication scheme selected by the computing service, indicate, with the authentication service, that the computing service supports the authentication scheme selected by the computing service.

16. The computing device of claim 10, wherein:
the received authentication request is formatted as a Hypertext Transport Protocol(HTTP) packet; and
the instructions, when executed, cause the computing device to:
analyze, with the authentication service, the received HTTP packet of the authentication request with an HTTP listener of the authentication service;
select, with the authentication service, an authentication handler corresponding to the authentication scheme that is supported by both the computing service and the authentication service; and
instruct, by the authentication service, the selected authentication handler to initiate the authentication process with the computing service.

17. A computer-implemented method comprising:
receiving, at an authentication service, an authentication request from a computing service;
dynamically selecting a particular authentication scheme, from multiple authentication schemes supported at the authentication service for the received authentication request, by analyzing, at the authentication service, the received authentication request for an indicator that the particular authentication scheme is supported by the computing service submitting the authentication request;
initiating, with the authentication service, an authentication process with the computing service according to the particular authentication scheme that is supported by the computing service and the authentication service; and
authenticating the authentication request from the computing service, using the initiated authentication process.

18. The computer-implemented method of claim 17, wherein analyzing, at the authentication service, the authentication request includes:
parsing, at the authentication service, a header of the authentication request;
determining, at the authentication service, whether the parsed header contains a value representing an indication that Windows authentication is enabled; and
in response to determining that the parsed header contains a value representing an indication that Windows authentication is enabled, indicating, at the authentication service, that the computing service supports Windows authentication.

19. The computer-implemented method of claim 17, wherein analyzing, at the authentication service, the authentication request includes:
parsing, at the authentication service, a header of the authentication request;
determining, at the authentication service whether the parsed header contains a value representing an indication that air authentication token is included with the authentication request; and
in response to determining that the parsed header contains a value representing an indication that an authentication token is included with the authentication request, indicating, at the authentication service, that the computing service supports bearer authentication.

20. The computer-implemented method of claim 17, wherein analyzing, at the authentication service, the authentication request includes:
parsing, at the authentication service, a payload of the authentication request;
based on the parsed payload, determining, at the authentication service, whether the authentication request is digitally signed with a digital signature; and
in response to determining that the authentication request is digitally signed with a digital signature, indicating, at the authentication service, that the computing service supports certificate authentication.

* * * * *